United States Patent Office 3,312,686
Patented Apr. 4, 1967

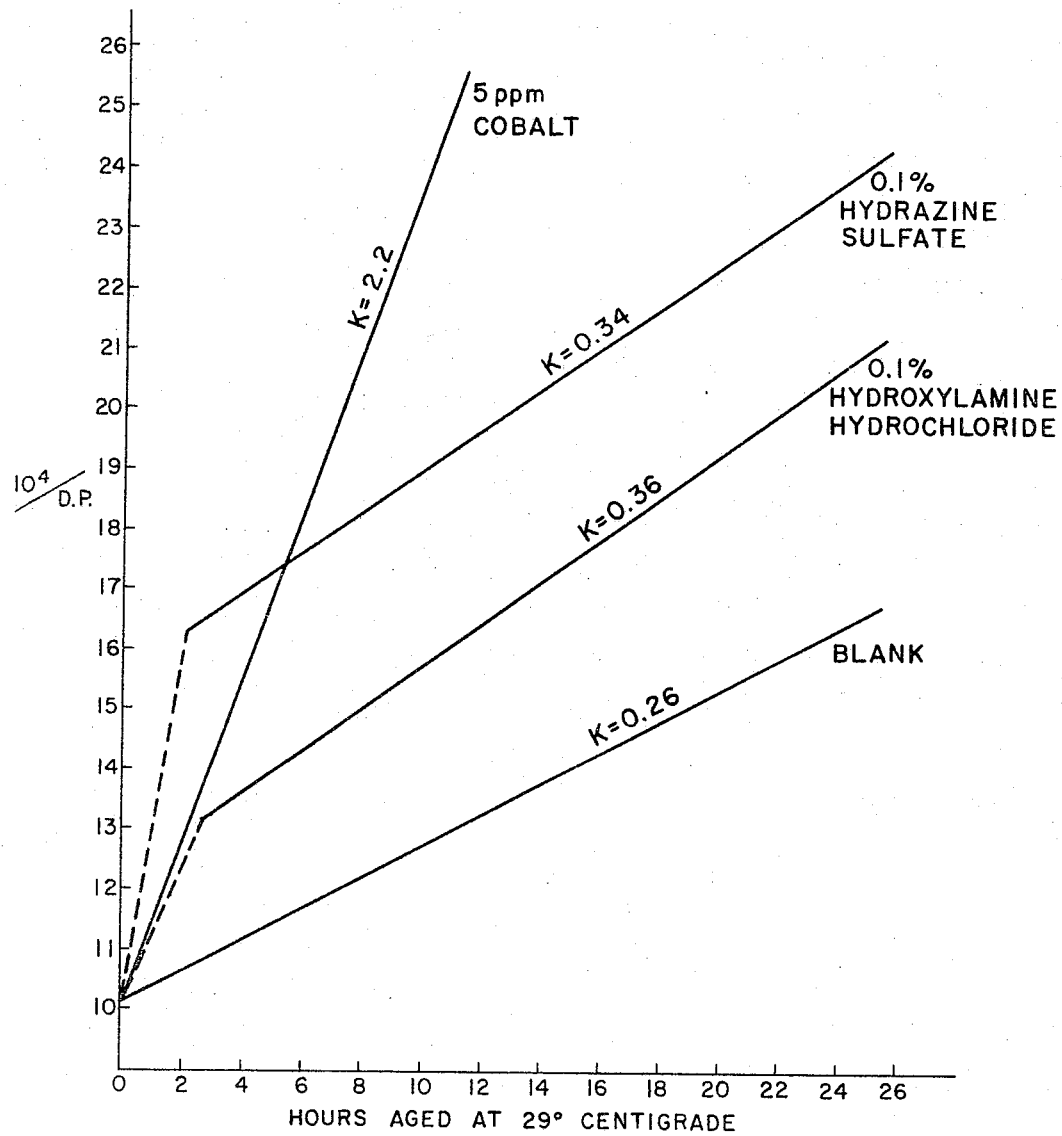

3,312,686
PROCESS FOR AGING ALKALI CELLULOSE
Joseph Sheppard James, Jr., Memphis, Tenn., assignor to The Buckeye Cellulose Corporation, Cincinnati, Ohio, a corporation of Ohio
Filed Mar. 16, 1964, Ser. No. 351,981
5 Claims. (Cl. 260—233)

This invention relates to the production of viscose and other cellulose derivatives and has for its general object the provision of a process for the accelerated aging of alkali cellulose (A.C.). More particularly, the invention provides a process for the aging of alkali cellulose whereby the drop in degree of polymerization (D.P.) of the alkali cellulose is controllably accelerated by the use of chemical agents. Specifically, the invention provides a process whereby the aging of alkali cellulose is accelerated by the presence of small amounts of at least one chemical agent selected from the group consisting of hydroxylamine, hydrazine, hydroxylamine hydrochloride, hydroxylamine sulfate, hydrazine sulfate, phenylhydrazine, p-nitrophenylhydrazine and semicarbazide hydrochloride.

Processes and chemical agents for the acceleration of aging in alkali cellulose are available in the prior art. These processes and chemical agents include, for example, the addition of water-soluble compounds of manganese to refined chemical pulp as taught in United States Patent No. 2,542,285, granted to Reid Logan Mitchell on Feb. 20, 1951. Also, United States Patent No. 2,841,579 granted to Jacques A. Villefroy et al. on July 1, 1958, teaches the efficacy of using tartaric and citric acids in conjunction with metallic, oxidation catalysts such as cobalt, manganese and iron in the aging of alkali cellulose. Furthermore, United States Patent No. 2,858,304 granted to William H. Bradshaw on Oct. 28, 1958, teaches the addition of an emulsifying agent together with an ogygen-containing gas to a slurry of alkali cellulose to accelerate alkali cellulose aging.

One primary problem in the aging of alkali cellulose is, however, the achievement of acceleration in aging without loss of, or an appreciably lesser degree of, control over the final D.P. as determined by conventional viscosometric methods. Other primary problems are associated with changes in spinning and dyeing action caused by the addition of aging accelerants, for example iron, nickel, cobalt and manganese compounds, which introduce heavy metal ions into the alkali cellulose. This latter problem is associated with the use of the aged alkali cellulose in the production of rayon fibers and films by the viscose process. The heavy metal ions also build up in the steeping caustic, resulting in a cumulative, uncontrolled acceleration of aging. Such steeping caustic, contaminated with heavy metal ions, is unusable in the case of alkali celluloses where aging acceleration is not desired. Applicants have discovered that accelerated and controllable aging of alkali cellulose without undesirable side effects is obtained with the chemical agents of this invention.

It is, therefore, an object of this invention to provide a novel process for the accelerated aging of alkali cellulose.

It is a further object of this invention to provide a process for the aging of alkali cellulose wherein accelerated aging is obtained without the introduction of metallic ions.

It is yet another object of this invention to provide an alkali cellulose aging process wherein the aging is initially greatly accelerated, but which thereafter proceeds at a rate substantially like that of alkali cellulose in the absence of accelerating agents, so that aging control is maintained.

These objects are achieved by the present invention which is directed to a process wherein the alkali cellulose is aged in the presence of minor amounts of one or more chemical agents selected from the group consisting of hydroxylamine, hydrazine, hydroxylamine hydrochloride, hydroxylamine sulfate, hydrazine sulfate, phenylhydrazine, p-nitrophenylhydrazine, and semi-carbazide hydrochloride.

The chemical agents can be brought into contact with the freshly prepared alkali cellulose by any of a variety of methods provided uniform and intimate dispersion is effected. For example, the solid or liquid chemical agents of this invention or solutions thereof can be added to the steeping caustic. The liquid chemical agents or solutions thereof can also be sprayed on cellulose sheets prior to steeping in either the sheet steeping or the slurry processes or otherwise incorporated during processing so as to be uniformly and intimately dispersed throughout the A.C. during aging. The preferred method of practice, however, is to add the chemical agents or solutions thereof to the alkali cellulose early in the shredding cycle after steeping. The chemical agents of this invention are employed in amounts of about 0.05% to about 0.5%, preferably 0.1% to about 0.3%, based on the weight of original cellulose and depending on the desired amount of D.P. reduction within the desired time and temperature limitations.

It is further understood that the herein described invention is directed to a process for the aging of alkali cellulose for any purpose. Therefore, the method of operation within the scope of the invention will depend on the precise D.P. and viscosity requirements for alkali cellulose to be used as a raw material in a given chemical process.

There are two conventional methods available in the art for the production of alkali cellulose starting with purified cellulose raw material. The process for accelerating the aging of alkali cellulose according to this invention is applicable to any method which may be utilized for the preparation of alkali cellulose.

In the more widely used sheet steeping method for the preparation of alkali cellulose, cellulose sheets are placed in a steeping press and soaked or steeped at about 25° C. in an aqueous solution containing approximately 18.0% sodium hydroxide by weight. The sodium hydroxide solution is normally introduced from the bottom of the steeping press trough, or enclosure, at such a rate that it rises in the sheets in the direction of the predominant lengthwise orientation of the pulp fibers at a rate equal to that induced by the capillarity of the pulp.

After about one hour of steeping, the resulting alkali cellulose is pressed to obtain the desired alkali cellulose composition. The pressed alkali cellulose is then mechanically reduced to crumbs in a suitable shredding device. This latter mechanical action takes place in about one hour.

The continuous or slurry process for the preparation of alkali cellulose differs from the sheet steeping method described above in that the pulp is slurried in a tank of aqueous sodium hydroxide solution instead of the sodium hydroxide solution being fed into a steeping press containing pulp sheets.

The slurry process for preparing alkali cellulose is usually conducted at temperatures above ambient temperature, often up to about 65° C., with the higher temperatures in the range being preferred because of the accelerated rate of alkali cellulose production, but desirable alkali celluloses are obtained at about 28° C. to about 30° C. After an average reaction time of about 15 minutes, the fibrous slurry is forced by pressure between rotating rolls which are slotted or perforated to permit drainage of the caustic. As in the sheet steeping method, the pressed cake of alkali cellulose is then mechanically reduced to crumbs by shredding.

After shredding, the alkali cellulose crumbs are aged under carefully controlled time and temperature conditions, and it is to this processing stage to which the present invention is directed. But it is to be understood that in actuality the aging of alkali cellulose begins and proceeds from the instant of A.C. formation.

In aging, the average molecular chain length of the cellulose is decreased to a D.P. of about 175 to about 800 so that subsequently produced cellulose derivative solutions, for example, solutions of cellulose xanthate, will have suitable viscosities for fiber and film formation and so that the end products will have proper strength properties. In still other specialized uses, for example the production of low viscosity cellulose derivative solutions, it may be desirable to reduce the D.P. of the alkali cellulose to about 100 or below depending on the intended end use of the cellulose derivative.

As stated hereinbefore, a primary advantage of the chemical accelerating agents of this invention is their ability to speed up the initial aging of alkali cellulose. The rapid initial aging is then followed by aging at a rate substantially like that of A.C. with no chemical accelerating agents present, so that the aging end-point can be easily controlled. It is highly important in the aging of alkali cellulose to be able to time and control aging so that subsequent processing steps in the manufacture of cellulose derivatives can be initiated at selected degrees of polymerization. Therefore, the aging method of this invention is applicable to alkali celluloses produced by any method and the present invention concerns only the presence of chemical accelerants, found advantageous by applicants, in the shredding and aging steps in the amounts hereinbefore stated.

The accompanying drawing illustrates the aging action of several of the chemical agents used in the present invention, a graph wherein $10^4$/D.P. is plotted versus the aging time in hours being shown. The graph, basis for which is given in "Some Considerations on the Aging of Alkali Cellulose," by Dowell, A. M., Jr., and Kuiken, K. A., TAPPI 46, #12, 726–30 (Dec., 1963), clearly shows the rapid aging action of cobalt (K-steepness of the aging curve), used in quantities of 5 p.p.m. (0.0005%) based on the weight of the original cellulose. The rapid action of the heavy metal accelerants makes control difficult because of the relatively large changes in D.P. incurred in short increments of time at the end of the aging period.

The action of hydrazine sulfate and hydroxylamine hydrochloride, used at the 0.1% level, based on the weight of cellulose present in the alkali cellulose, portrayed on the graph as typical of the aging action of the present compounds, shows the initial displacement of the aging line upward to lower degrees of polymerization with these compounds while maintaining a relatively low slope in the aging line substantially like that of the control sample in which no additive was present.

A shortened time for the required aging of alkali cellulose confers the obvious benefit of decreasing the investment necessary for aging cans and handling equipment. The achievement of aging acceleration with maintained control and without side effects allows taking advantage of decreased holding requirement without suffering quality penalties.

Addition of greater or lesser amounts of the chemical accelerating agents of this invention displaces the aging line upward in an amount proportional to the amount of the particular chemical agent used, but after the initial advantageous rapid aging period achieved in the practice of this invention retains the relatively low slope aging line of unaccelerated alkali cellulose. In this manner a means is provided whereby alkali cellulose having a given degree of polymerization can be obtained in a selected shortened time while retaining the control advantage of a relatively low slope for the aging curve. In practical terms, this means that the desired final D.P. of the aged alkali cellulose produced according to this invention is not greatly affected by small errors in time control during aging.

The alkali celluloses produced by the process of this invention are well suited to the production of viscose rayon and other cellulose derivatives wherein an aged alkali cellulose is the desired raw material.

The degrees of polymerization stated herein were determined by first determining the cupriethylenediamine viscosity (C.E.D. viscosity) of the cellulose recovered from the alkali cellulose samples. The C.E.D. viscosities were determined by the method designated as TAPPI T–230 sm–50 with the modification that the cellulose sample is put into solution with the cupriethylenediamine solvent under a nitrogen atmosphere. The C.E.D. viscosities were then converted to D.P.'s according to the following equation:

$$\text{Nitrate D.P.} = [1{,}439 \log_{10}(0.5\% \text{ C.E.D. viscosity})] - 387.4$$

which correlates the nitrate D.P.'s, determined by TAPPI T–238 su–63 with the more easily determinable C.E.D. viscosities.

The viscose viscosities referred to herein are the conventional ball fall second viscosities, referred to in "The Methods of Cellulose Chemistry," by Doree, 2nd edition, page 269, and used throughout the viscose industry, which are stated as the seconds necessary for a ⅛-inch stainless steel ball to fall through 20 centimeters of viscose at 20° C. In the following examples the viscose viscosities were run on viscoses prepared from the A.C. samples to contain 4.5% cellulose, 2.1% sodium hydroxide and 1.8% total sulfur.

The alkali celluloses used in the following Examples I and II were prepared by the conventional sheet-steeping method described hereinbefore, and the resulting A.C. was pressed to a press-weight ratio of about 2.6. The A.C. of Example III was prepared by the slurry procedure.

The following examples will illustrate in detail the manner in which the invention may be practiced. It will be understood, however, that the invention is not confined to the specific limitations set forth in the individual examples, but rather to the scope of the appended claims.

*Example I*

Hydroxylamine hydrochloride was added to freshly prepared alkali cellulose, prepared by the conventional steeping method, at the start of the shredding cycle, as an aqueous solution containing 25% of the chemical. The amount of solution added was such that 0.1% of the hydroxylamine hydrochloride was present based on the original weight of cellulose. The alkaline cellulose was shredded at room temperature for 50 minutes in a mixing and shredding machine and then additionally aged for 21 hours at 17° C. An identical sample of alkali cellulose was shredded and aged in the same manner with the exception that no hydroxylamine hydrochloride was added. Also, other shredded samples were prepared in the manner of Example I with the exception that they contained 0.1% or 0.2% of hydroxylamine sulfate, hydrazine sulfate, phenylhydrazine, semicarbazide hydrochloride or p-nitrophenylhydrazine instead of 0.1% hydroxylamine hydrochloride. The D.P. of cellulose recovered from the aged alkali cellulose and the viscose viscosity of the blank run are given in Table I below together with those of the alkali celluloses containing the above named chemical agents.

TABLE I

| Additive | Aged A.C., D.P. | Viscose Viscosity, sec. |
|---|---|---|
| None | 760 | 98 |
| 0.1% Hydroxylamine hydrochloride | 530 | 24 |
| 0.1% Hydroxylamine sulfate | 540 | 24 |
| 0.1% Hydrazine sulfate | 440 | 11 |
| 0.2% Hydrazine sulfate | 380 | 6 |
| 0.1% Phenylhydrazine | 420 | 10 |
| 0.2% Phenylhydrazine | 320 | 5 |
| 0.1% Semicarbazide hydrochloride | 685 | 83 |
| 0.2% Semicarbazide hydrochloride | 640 | 41 |
| 0.1% p-nitrophenylhydrazine | 720 | 65 |

The results given in Table I above demonstrate the accelerated lowering of D.P. shown by alkali celluloses containing the chemical agents of this invention. The alkali celluloses aged in the process of Example I can be employed in the preparation of cellulose xanthate for the production of fibers and films in the preparation of cellulose ethers and esters.

Substantially correspdonding accelerated aging rates are obtained when 0.1% hydrazine is used as the chemical accelerating agent in place of 0.1% hydrazine sulfate. Similarly, a mixture of 0.05% hydroxylamine sulfate and 0.05% hydrazine sulfate can be used with correspondingly improved aging results.

*Example II*

In order to investigate the relative decrease in D.P. obtainable in a 1-hour shredding cycle with no aging time thereafter, 0.1% of hydrazine sulfate based on the weight of cellulose in the alkali cellulose was introduced at the start of the shredding cycle into freshly prepared alkali cellulose. The hydrazine sulfate was introduced as a solution containing 25% by weight of the chemical agent in dilute sodium hydroxide, and the alkali cellulose was prepared by the sheet steeping procedure. At the end of a 1-hour shredding period at approximately room temperature, the shredder was stopped, and a sample of the alkali cellulose was taken. The D.P.'s and viscose viscosities of this sample and samples prepared according to the procedure of this example but containing 0.1% and 0.2% of phenyl-hydrazine are given below in Table II together with the D.P. and viscose viscosity of an identically prepared alkali cellulose to which no accelerant was added.

TABLE II

| Additive | D.P. at end of 1 hr. shredding | Viscose Viscosity, sec. |
|---|---|---|
| None | 930 | 214 |
| 0.1% Hydrazine sulfate | 675 | 57 |
| 0.1% Phenylhydrazine | 510 | 19 |
| 0.2% Phenylhydrazine | 395 | 9 |

The results given in Table II show that the D.P. lowering with the present chemical aging accelerants is quite rapid in one hour shredding, and that increased amounts of the accelerants increase the amount of D.P. reduction. The alkali celluloses aged in the manner of Example II can be used in the production of viscose with no aging time required past the shredding period.

The accelerated aging rates obtained by the process of Example II are also obtained when the chemical accelerating agents are applied to the cellulose prior to its conversion into alkali cellulose.

*Example III*

Multiple samples weighing twenty grams each of air dry wood pulp were slurried in 650 ml. portions of 17.5% NaOH at 29° C. Just prior to adding the pulp to the caustic steeping solution, a small quantity of hydroxylamine hydrochloride or hydrazine sulfate was added to the individual solutions. The quantity of the aforementioned chemical agents, 0.41 gm., 0.82 gm., or 2.04 gm., was sufficient to result in concentrations of 0.1%, 0.2%, or 0.5% of the chemical agent based on the weight of cellulose in the alkali cellulose when pressed to a 2.9 press weight ratio. Pulp samples containing 5 p.p.m. (0.0005%) of cobalt were also processed in this manner, but without the addition of the above chemical agents to the steeping caustic. Finally, a control sample containing neither cobalt nor the chemical agents of this invention was run.

The pressed alkali cellulose was disintegrated with stainless steel forks, then placed in sealed bottles in a 29° C. aging bath. Samples of alkali cellulose were removed from the bottles after 2, 3, 6, 7, 24, and 25 hour aging periods. The degree of polymerization was determined on the cellulose recovered from the aged A.C.

$10^4$/D.P. was plotted vs. aging time and the slope of the resultant curve was calculated in the conventional manner. This slope, or aging rate K, was a measure of the actual rate of molecular bond cleavage in the cellulose. The results for these tests are given in Table III.

TABLE III

| Additive | Aging Rate, K. | D.P. after 24 hr. age |
|---|---|---|
| None | 0.26 | 610 |
| 0.1% Hydroxylamine hydrochloride | 0.36 | 480 |
| 0.2% Hydroxylamine hydrochloride | 0.41 | 415 |
| 0.5% Hydroxylamine hydrochloride | 0.46 | 320 |
| 0.1% Hydrazine sulfate | 0.34 | 420 |
| 0.2% Hydrazine sulfate | 0.41 | 360 |
| 0.5% Hydrazine sulfate | 0.56 | 260 |
| 5 p.p.m. Cobalt (On pulp) | 2.2 | 200 |

These results show that the aging rate, K (the slope of the aging curve), for the chemical additives of this invention is appreciably less than that with the cobalt catalyst when conditions are such that a similar magnitude of D.P. is reached in a given time. Similar aging results are obtained when hydroxylamine is used as a chemical accelerating agent in the manner of Example III.

While specific examples of methods embodying the present invention have been described above, it will be apparent that many changes and modifications may be made in the methods of procedure without departing from the spirit of the invention. It will be understood, therefore, that the examples cited and the procedures set forth are intended to be illustrative only and are not intended to limit the invention.

Having thus described the invention, what is claimed is:

1. In the aging of alkali cellulose for the preparation of cellulose derivatives, the improvement wherein aging of the alkali cellulose is accomplished in the uniformly dispersed and intimate presence of about 0.05% to about 0.5% based on the weight of the original cellulose, of at least one chemical agent selected from the group consisting of hydroxylamine, hydrazine, hydroxylamine hydrochloride, hydroxylamine sulfate, hydrazine sulfate, phenylhydrazine, semicarbazide hydrochloride and p-nitrophenylhydrazine.

2. In the aging of alkali cellulose for the preparation of cellulose derivatives, the improvement wherein aging of the alkali cellulose is accomplished in the uniformly dispersed and intimate presence of about 0.1% to about 0.3%, based on the weight of the original cellulose, of at least one chemical agent selected from the group consisting of hydroxylamine, hydrazine, hydroxylamine hydrochloride, hydroxylamine sulfate, hydrazine sulfate, phenylhydrazine, semicarbazide hydrochloride and p-nitrophenylhydrazine.

3. The improvement in the aging of alkali cellulose as described in claim 2 wherein the chemical agent is incorporated in the chemical cellulose prior to the formation of alkali cellulose.

4. The improvement in the aging of alkali cellulose as described in claim 2 wherein the chemical agent is added to the alkali cellulose during shredding.

5. The improvement in the aging of alkali cellulose as described in claim 2 wherein the chemical agent is added to the sodium hydroxide in the preparation of the alkali cellulose.

No references cited.

LEON J. BERCOVITZ, *Primary Examiner.*

R. W. MULCAHY, *Assistant Examiner.*